(12) United States Patent
Chang

(10) Patent No.: US 12,490,312 B2
(45) Date of Patent: Dec. 2, 2025

(54) ADAPTIVE EXTENDED KEEPING RESERVATION THRESHOLD PROBABILITY MECHANISM SYSTEM WITH RESOURCE WATCHING WINDOW AND DYNAMIC BACK-OFF FOR CONTENTION-BASED 5G/B5G SIDELINK AND METHOD THEREOF

(71) Applicant: Nat'l Yunlin University of Science and Technology, Douliu (TW)

(72) Inventor: Ben-Jye Chang, Douliu (TW)

( * ) Notice: Subject to any disclaimer, the term of this patent is extended or adjusted under 35 U.S.C. 154(b) by 370 days.

(21) Appl. No.: 18/122,123

(22) Filed: Mar. 16, 2023

(65) Prior Publication Data

US 2024/0314851 A1  Sep. 19, 2024

(51) Int. Cl.
*H04W 74/0833* (2024.01)
*H04W 72/11* (2023.01)

(52) U.S. Cl.
CPC .......... *H04W 74/085* (2013.01); *H04W 72/11* (2023.01)

(58) Field of Classification Search
CPC .... H04W 74/085; H04W 72/11; H04W 72/40
See application file for complete search history.

(56) References Cited

U.S. PATENT DOCUMENTS

| | | | |
|---|---|---|---|
| 2007/0047570 A1* | 3/2007 | Benveniste | H04L 47/32 370/448 |
| 2022/0150751 A1* | 5/2022 | Newman | H04W 72/21 |
| 2023/0354386 A1* | 11/2023 | Hui | H04W 72/20 |
| 2024/0237069 A1* | 7/2024 | Abushattal | H04W 74/0841 |

FOREIGN PATENT DOCUMENTS

WO  WO-2020069111 A1 *  4/2020  ........... H04W 72/02

OTHER PUBLICATIONS

Chang, Ben-Jye & Guang-Jie Jhang, "Minimizing contention collision probability and guaranteeing packet delay for cloud big data transmissions in 4G LTE-A packet random access," Computer Networks, vol. 112, pp. 329-344, Elsevier, Nov. 2016 (Year: 2016).*

* cited by examiner

*Primary Examiner* — Ricky Q Ngo
*Assistant Examiner* — David M Kayal
(74) *Attorney, Agent, or Firm* — Chih Feng Yeh; Yongjean Consulting Inc.

(57) ABSTRACT

An adaptive extended keeping reservation threshold probability mechanism system with resource watching window and dynamic back-off for contention-based 5G/B5G sidelink and a method thereof are disclosed. An adaptive extended Sigmoid mechanism can be applied to reduce a contention collision probability for the different types of flows contending a usage resource; a watching window can be applied to guarantee certain probability and reserve resource for a high priority flow; using dynamic truncated binary exponential (TBE) back-off mechanism can stagger the flows occurring resource collision to avoid the same consecutive collision, so as to effectively reduce contention collision probability, and improve resource usage rate and the probability of successful flow transmission. Therefore, the effect of minimizing collision probability and access delay and maximizing successful probability and throughput can be achieved.

6 Claims, 6 Drawing Sheets

ADAPTIVE EXTENDED KEEPING RESERVATION THRESHOLD PROBABILITY MECHANISM SYSTEM WITH RESOURCE WATCHING WINDOW AND DYNAMIC BACK-OFF FOR CONTENTION-BASED 5G/B5G SIDELINK AND METHOD THEREOF

BACKGROUND

1. Technical Field

The present invention is related to a 5G/B5G transmission mechanism system and a method thereof, and more particularly to a 5G/B5G transmission adaptive extended keeping reservation threshold probability mechanism system with resource watching window and dynamic back-off for contention-based 5G/B5G sidelink and a method thereof.

2. Description of the Related Art

The sensing-based semi-persistent scheduling in 5G/B5G sidelink semi-persistent scheduling of the random contention mechanism of 5G/B5G sidelink does not specify different collision areas for different types of flow, so the contention collision probability caused by various types of flows (such as the same type of flows or different types of flows) is significantly increased and the access delay may be degraded. The non-real time (NRT) type of flow has a longer resource reservation interval to effectively differentiate the collision area, and this is because the longer interval range has more time slots, the contention collision probability can be reduced. On the contrary, the real time (RT) type of flow has a shorter resource reservation interval and easily causes contention collision. When contention collision has already occurred, the 5G/B5G sidelink sensing-based semi-persistent scheduling may neglect the back-off mechanism to avoid further contention collision.

According to above-mentioned contents, what is needed is to develop an improved solution to solve the problem that there is no effective mechanism for Vehicle-to-Everything communication of unicasting or groupcasting (V2X) in 5G/B5G sidelink semi-persistent scheduling in Internet of Vehicles (IoV) to avoid contention collision.

SUMMARY

An objective of the present invention is to disclose an adaptive extended keeping reservation threshold probability mechanism system with resource watching window and dynamic back-off for contention-based 5G/B5G sidelink and a method thereof, to solve the problem that there is no effective mechanism for Vehicle-to-Everything communication of unicasting or groupcasting (V2X) in 5G/B5G sidelink semi-persistent scheduling in IoV to avoid contention collision.

In order to achieve the objective, the present invention provides an adaptive extended keeping reservation threshold probability function mechanism system with resource watching window and dynamic back-off for contention-based 5G/B5G sidelink, the adaptive extended mechanism system is adapted to a user equipment communicating via 5G/B5G and includes a flow differentiating module, a flow guarantee module, a resource estimation module and a collision differentiating module.

The flow differentiating module is configured to differentiate different types of flows in collision domains based on key parameters of collision probability. The flow guarantee module is configured to provide and guarantee access probability for a high type of flow and a flow with low contention collision probability, to formulate an adaptive extended Sigmoid. A 5G/B5G sidelink semi-persistent scheduling of the user equipment determines a range of a sensing window, which is configured to sense and monitor, for a sender, and the resource estimation module estimates an available random contention resource within the sensing window, to prevent the contention collision probability from being high to reduce a resource reservation efficiency. The collision differentiating module is configured to apply a dynamic truncated binary exponential (TBE) back-off algorithm to differentiate the collision domains based on an amount of collisions, to reduce an amount of contention collisions and improve a usage rate of a semi-persistent scheduling resource.

In order to achieve the objective, the present invention provides an adaptive extended keeping reservation threshold probability mechanism method with resource watching window and dynamic back-off for contention-based 5G/B5G sidelink, the adaptive extended mechanism method is adapted to a user equipment communicating via 5G/B5G and includes steps of: differentiating different types of flow in collision domains based on key parameters of collision probability, by the user equipment; providing and guaranteeing access probability for a high type of flow and a flow with a low contention collision probability to formulate an adaptive extended Sigmoid, by the user equipment; determining a range of a sensing window, which is configured to sense and monitor, for a sender, by a 5G/B5G sidelink semi-persistent scheduling of the user equipment, and estimating an available random contention resource within the sensing window to prevent the contention collision probability from being high to reduce a resource reservation efficiency; applying the dynamic truncated binary exponential (TBE) back-off algorithm to differentiate the collision domains based on an amount of collisions, to reduce number of contention collision and improve usage rate of the semi-persistent scheduling resource, by the user equipment.

According to the above-mentioned system and method of the present invention, the difference between the present invention and the conventional technology is that the adaptive extended Sigmoid mechanism of the present invention can be applied to reduce the contention collision probability for the different types of flows contending a usage resource; the watching window can be applied to guarantee certain probability and reserve resource for the high priority (that is, more urgent) flow; applying dynamic truncated binary exponential (TBE) back-off mechanism can stagger the flows occurring resource collision to avoid the same consecutive collision, so as to effectively reduce contention collision probability, and improve resource usage rate and the probability of successful flow transmission.

Therefore, the above-mentioned solution of the present invention is able to achieve the effect of minimizing collision probability and access delay and maximizing successful probability and throughput.

BRIEF DESCRIPTION OF THE DRAWINGS

The structure, operating principle and effects of the present invention will be described in detail by way of various embodiments which are illustrated in the accompanying drawings.

DETAILED DESCRIPTION

Figure 1:
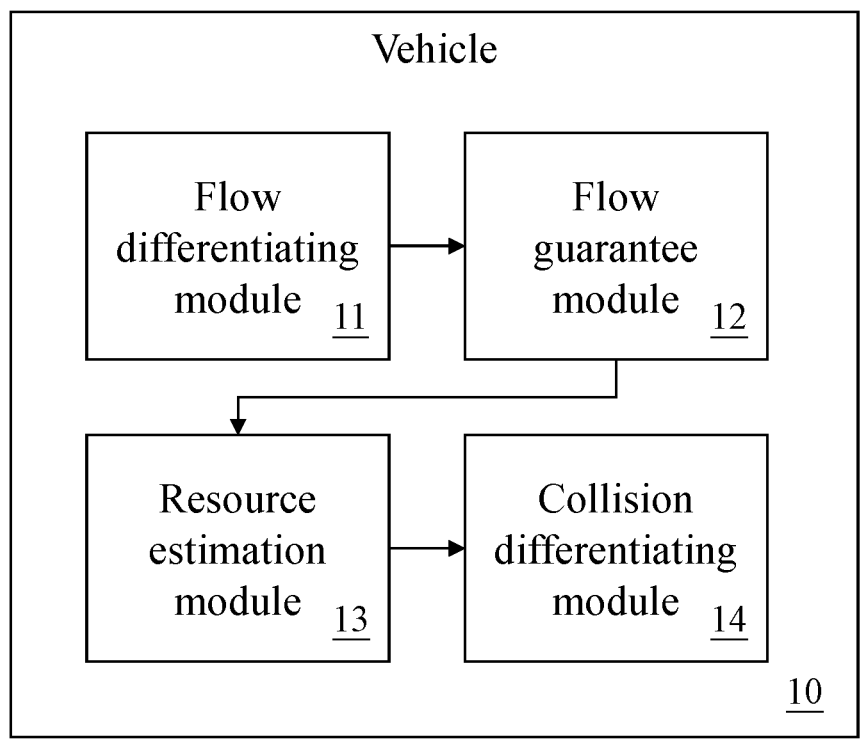
FIG. 1 is a system block diagram of an adaptive extended keeping reservation threshold probability mechanism system with resource watching window and dynamic back-off for contention-based 5G/B5G sidelink, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The adaptive extended keeping reservation threshold probability mechanism system with resource watching window and dynamic back-off for contention-based 5G/B5G sidelink of the present invention will be illustrated in the following paragraphs. Please refer to FIG. 1, which is a system block diagram of an adaptive extended keeping reservation threshold probability mechanism system with resource watching window and dynamic back-off for contention-based 5G/B5G sidelink, according to the present invention.

As shown in FIG. 1, the adaptive extended mechanism system is adapted to a vehicle 10 communicating via 5G/B5G, and includes a flow differentiating module 11, a flow guarantee module 12, a resource estimation module 13, and a collision differentiating module 14.

The flow differentiating module 11 is configured to differentiate different types of flows in collision domains based on key parameters of collision probability. The flow guarantee module 12 is configured to provide and guarantee access probability for a high type of flow and a flow with low contention collision probability, to formulate an adaptive extended Sigmoid. A 5G/B5G sidelink semi-persistent scheduling of the user equipment determines a range of a sensing window, which is configured to sense and monitor, for a sender, and the resource estimation module 13 estimates an available random contention resource within the sensing window, to prevent the contention collision probability from being high to reduce a resource reservation efficiency. The collision differentiating module 14 is configured to apply a dynamic truncated binary exponential (TBE) back-off algorithm to differentiate the collision domains based on an amount of collisions, to reduce an amount of contention collisions and improve a usage rate of a semi-persistent scheduling resource.

In order to realize the Internet of Vehicles (IoV) in 5G/B5G mobile communication, the direct communication between vehicles via the enhanced-Vehicle-to-Everything (eV2X) has become a key technology. The 5G/B5G new radio (NR) frequency band 1 (FR1) in the PC5 interface is operated in the 5.9 GHz licensed spectrum (2570 to 2620 MHz and 5855 to 5925 MHz). Therefore, 5G/B5G standard specifies sidelink (SL) eV2X mode 4 mechanism to enable V2V communicating directly without a generation node B (gNB) controlling and operating not in the gNB service range, even though 5G/B5G SL needs the radio frequency spectrum for realizing different functional radio channels in physical, transport and logical layers, e.g., physical SL shared channel (PSSCH) with RBs and physical SL control channel (PSCCH) with 2 RBs.

In 5G/B5G SL eV2X, in a condition that type k flow data packets arrive at a transmitter $V^i$ of vehicle i (or user equipment UE), and requests the resource pool state $V^i$ of receiver vehicle. Then, vehicle i (or denoted by $V^i$) randomly reserves for transport block (TB) via physical SL shared channel(PSSCH) by sending the SL Control Information (SCI) to the receiver vehicle j (or $V^j$) through 5G/B5G physical SL control channel (PSCCH) in prior, and reserves SCI in the transmission block (TB). It should be noted that the SL eV2X defines two multiplexing types of physical channels including an adjacent type and a non-adjacent type. The resource pool is split into several sub-channels, in which the first 2 sub-channel RBs are allocated for PSCCH and more than 1 sub-channel RB are allocated for PSSCH. For efficiently utilizing RBs and avoiding using non-adjacent type data in resource pool, PSSCH for data can overlap PSCCH. In PSCCH, the 32-bit SCI format includes priority value, resource reservation value, resource indication value, time gap, modulation and coding scheme (MCS), retransmission index and reserved information. In PSSCH, a TB of RBs with different MCSs are allowed to be allocated for flow data transmissions.

Diverse applications with different QoS/KPI services in delay, reliability, loss, data rate, etc. contend the limited capacity of the receiver's resource pool before flow data transmissions. Based on the 5G/B5G SL eV2X specifying the sensing-based semi-persistent scheduling (SPS) in the contention-based random access, after the sender obtains the receiver's resource pool state, the sender randomly determines two random parameters including a resource reservation interval (RRI) and a resource reservation counter (RRC). The sender randomly contends TB by sending the sidelink control information (SCI) to the receiver in prior, and the randomly selecting RRI in 4-bit set in SCI's resource reservation field to receiver's resource pool; at the same time, the sender additionally randomly generates RRC for the sender itself to check whether to randomly keep the reserved TB. Furthermore, for supporting different QoS for different types of flows, 5G/B5G SPS specifies various RRC ranges for different RRIs; particularly, for RT with short delay such as 20 (ms), the RRI range is [25, 75]; for NRT with long delay such as 100 (ms), the RRI range is set as [5, 15]; however, these examples are merely for exemplary illustration, and the scope of the present invention is not limited thereto. When the resource reservation field of SCI randomly determined by the sender is '1011', it means that "RRI=20 (nm)" is set to the corresponding SCI in the receiver's resource Pool. When there are more than two senders (or vehicles) set individual RRI value to the same SCI, it may cause contention collision because the receiver cannot obviously identify the SCI content; otherwise, the sender wins the contention, and then the receiver replies the sender with the allocated TB. Next, the sender sends flow data packets to the allocated TB every RRI (ms) and decreases RRC by one (that is, RRC←RRC−1). When RRC=0, 5G/B5G SL SPS mechanism allows the sender to initialize the randomly conditional piggyback-based resource reservation. Specifically, when the randomly-determined probability P is less than the keeping-reservation-threshold probability $P_{rk}$ (that is, $P \leq P_{rk}$), the sender successfully keeps the right to transmit data in the same TB(s); otherwise, the sender releases the reserved TB(s) and randomly reselects (or reserves) for new TB(s).

These vehicles broadcast and exchange the basic safe message (BSM), and the sender determines the communication in type of either unicasting or groupcasting. Due to the distributed (not a centralized) mechanism, the sender first senses resource usage state within the sensing window of $[t_{n-1000}^{sf}, t_n^{sf}]$, for example, the sensing window can be the immediate past 1000 sub-frame time (sft) before selecting the resource. The sender randomly determines RRI that is for booking in the receiver's resource pool, and RRC that will be kept in the sender. The sender sends the SCI with RRI to the receiver to reserve TB(s) within the selection window of RRI length. Furthermore, after a successful transmission, the value of RRC is decreased by one and the sender checks whether the value of RRC becomes zero. When RRC is not zero, the sender is allowed to send flow data to the receiver with the interval of RRI (in time); otherwise, when the RRC is zero, the randomly conditional piggyback-based resource reservation is performed. In other words, the sender randomly generates the reservation probability P, and then checks whether the generated reservation probability P is larger than the keeping reservation threshold probability $P_{rk}$. When $P \leq P_{rk}$, the sender keeps the original reserved TB(s) for further flow data transmission; otherwise, when $P > P_{rk}$, the sender re-selects new resource of TB(s).

In a condition that two or more numbers of sender vehicles reserve the same TB resource, the receiver detects whether contention collision occurs in 4 (ms). When no contention collision occurs, the receiver sends a HARQ_ACK message to notify the senders; otherwise, the receiver sends HARQ_NAK message to the senders for further resource contention again.

In order to solve above mentioned conventional problem of IoV Vehicle-to-Everything (V2X) communication of unicasting or groupcasting in 5G/B5G SL SPS, the present invention discloses an adaptive extended Sigmoid-based resource reservation (eSRR) mechanism for 5G/B5G SL accesses, so as to minimize access delay, delay jitter and contention collision probability as well as to maximize transmission reliability and stability.

In the randomly distributed contention mechanism of 5G/B5G SL SPS, for increasing goodput, 5G/B5G SPS adopts the static keeping reservation threshold probability, i.e. $P_{rk}$=0.8, for all senders to keep the original reserved TBs for further ADAS message transmissions. Such static threshold probability $P_{rk}$ suffers from dynamic contentions of different priorities of flows. That is, these senders randomly reserve the same TB, and it results in contention collision because the receiver cannot certainly identify the collided SCI information. As a result, the 5G/B5G SL SPS easily causes high contention collision and long access delay.

The adaptive extended Sigmoid-based resource reservation mechanism differentiates the collision domains of different types of flows (such as uRLLC-dangerous, or uRLLC-safe) based on the key parameter of collision probability. When RRC becomes zero, the sender initializes the randomly conditional piggyback-based resource reservation for guaranteeing the access probability for the higher type flow and the flow with lower contention collision probability, and the keeping reservation threshold probability $P_{rk}$ of them should be a larger value. The keeping reservation threshold probability of type k flow with collision probability $P_c^k$ is formulated as an extended Sigmoid function, as shown below:

$$P_{rk}^k(p_c, p_c^k, U(t)) = 1 - \frac{1}{1 - \delta^k \cdot e^{-p_c}}.$$

$p_c$ denotes the total contention collision probability; $\delta^k$ denotes the fine tune-up factor based on the collision probability $p_c^k$ of type k flow.

The network utilization is denoted as U(t), $0 < U(t) \leq 1$, and $\delta^k$ is formulated as shown below:

$$\delta^k = \frac{-\log(p_c^k)}{U(t)}.$$

In a range of $0.01 < \delta^k < 10$, when $\delta^k = 1$, the above-mentioned extended Sigmoid function $$P_{rk}^k(p_c, p_c^k, U(t)) = 1 - \frac{1}{1 - \delta^k \cdot e^{-p_c}}$$

becomes a general Sigmoid function.

Figure 2:
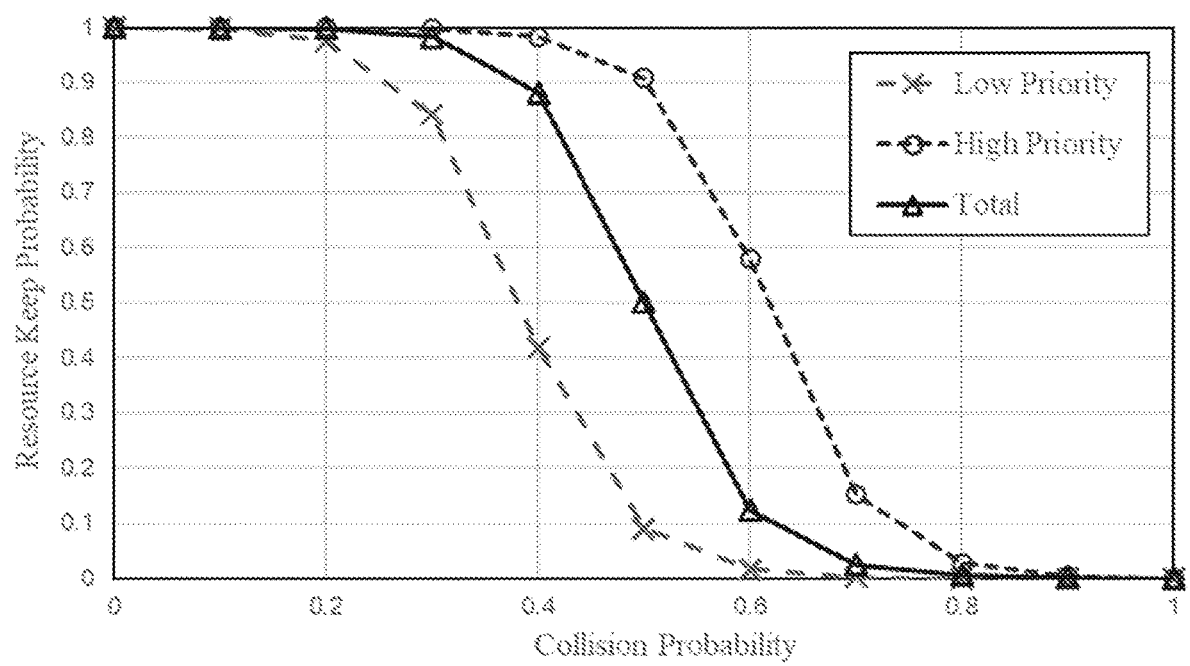
FIG. 2 is a diagram showing resource keep probabilities with Sigmoid based on collision probability, according to the present invention.

For dynamically determining $P_{rk}$ in different collision probabilities, the adaptive keeping reservation threshold probability function $P_{rk}^k(\cdot)$ is formulated as an extended Sigmoid function 21. Please refer to FIG. 2, which is a diagram showing resource keeping reservation probability formulated as Sigmoid function based on collision probability. Specifically, $P_{rk}^k(\cdot)$ is decreased logarithmically from 1.0 to 0.5 as the total contention collision probability $p_c$ is increased from 0 to 0.5, and it means that the adaptive 5G/B5G SL SPS should moderately decrease the keeping reservation threshold probability. In other words, the re-selection probability should be increased, to increase the contention collision probability from low to moderate one; conversely, $P_{rk}^{k}(\bullet)$ is decreases exponentially from 0.5 to 0.0 as the total contention collision probability $p_c$ increasing from 0.5 to 1.0; the reason is the available resource of TB is obviously decreased.

Figure 3A:
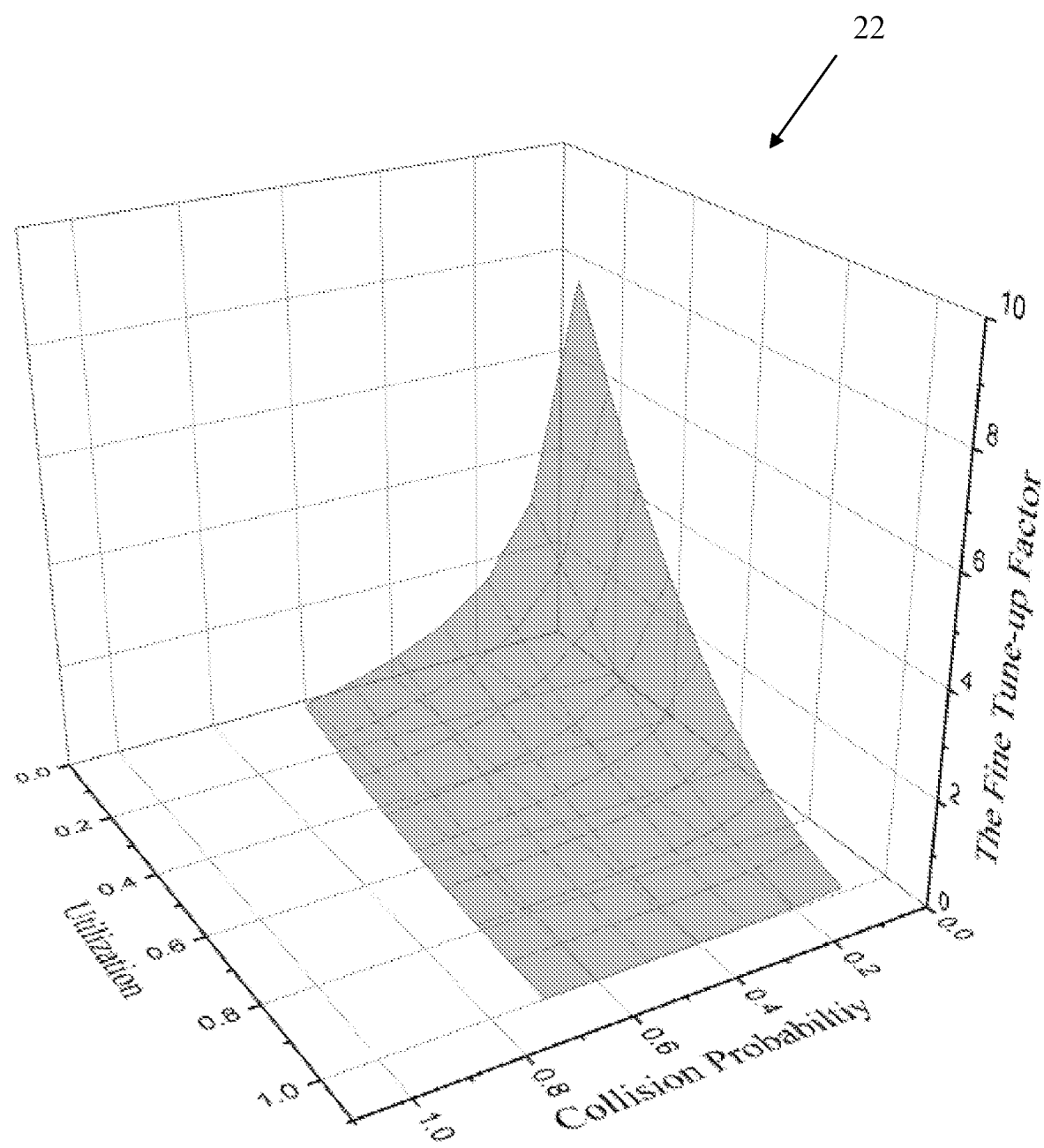
FIG. 3A is a diagram showing a tune-up factor of high type of flow, according to the present invention.
Figure 3B:
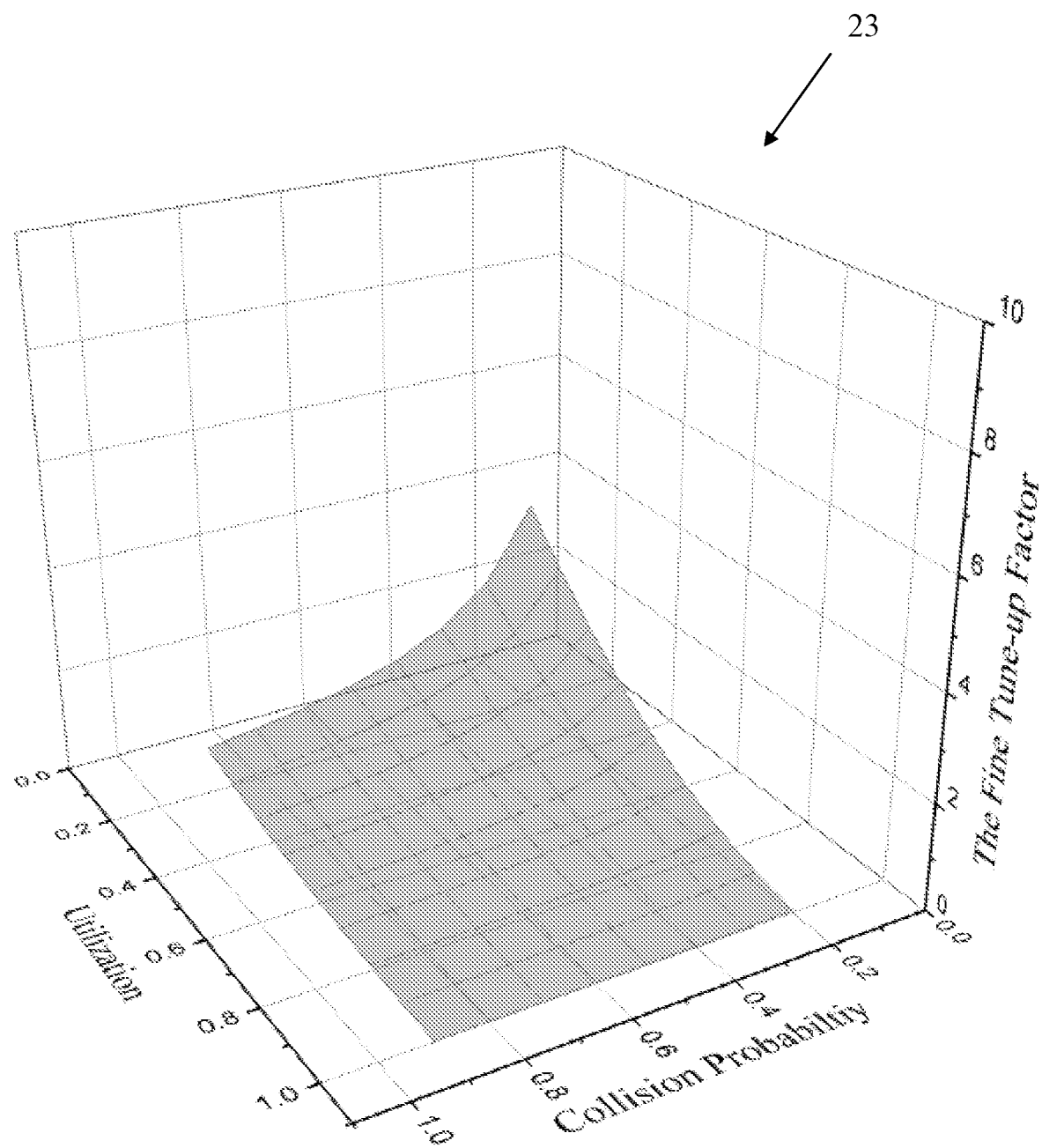
FIG. 3B is a diagram showing a tune-up factor of low type of flow, according to the present invention.

Please refer to FIGS. 3A and 3B. FIG. 3A is a diagrams showing tune-up factor of high type of flow, according to the present invention; FIG. 3B is a diagram showing tune-up factor of low type of flow, according to the present invention.

For differentiating the collision domains (the collision domain 22 and the collision domain 23) of different types of flows, the fine tune-up factor, the collision probability of type flow, and network utilization are applied. For a higher type of flow, $\delta^k$ is increased clearly and then results in a large for keeping the resource reservation. Conversely, for a lower type of flow, $\delta^k$ is decreased, and then leads to a low $\delta^k$ for keeping the resource reservation. FIGS. 3A and 3B demonstrate the dynamic fine tune-up factor for the higher and lower types of flows, respectively, under different impact factors including the collision probability of type flow, network utilization, and different numbers of vehicles ranging from 70 to 420.

Figure 4:
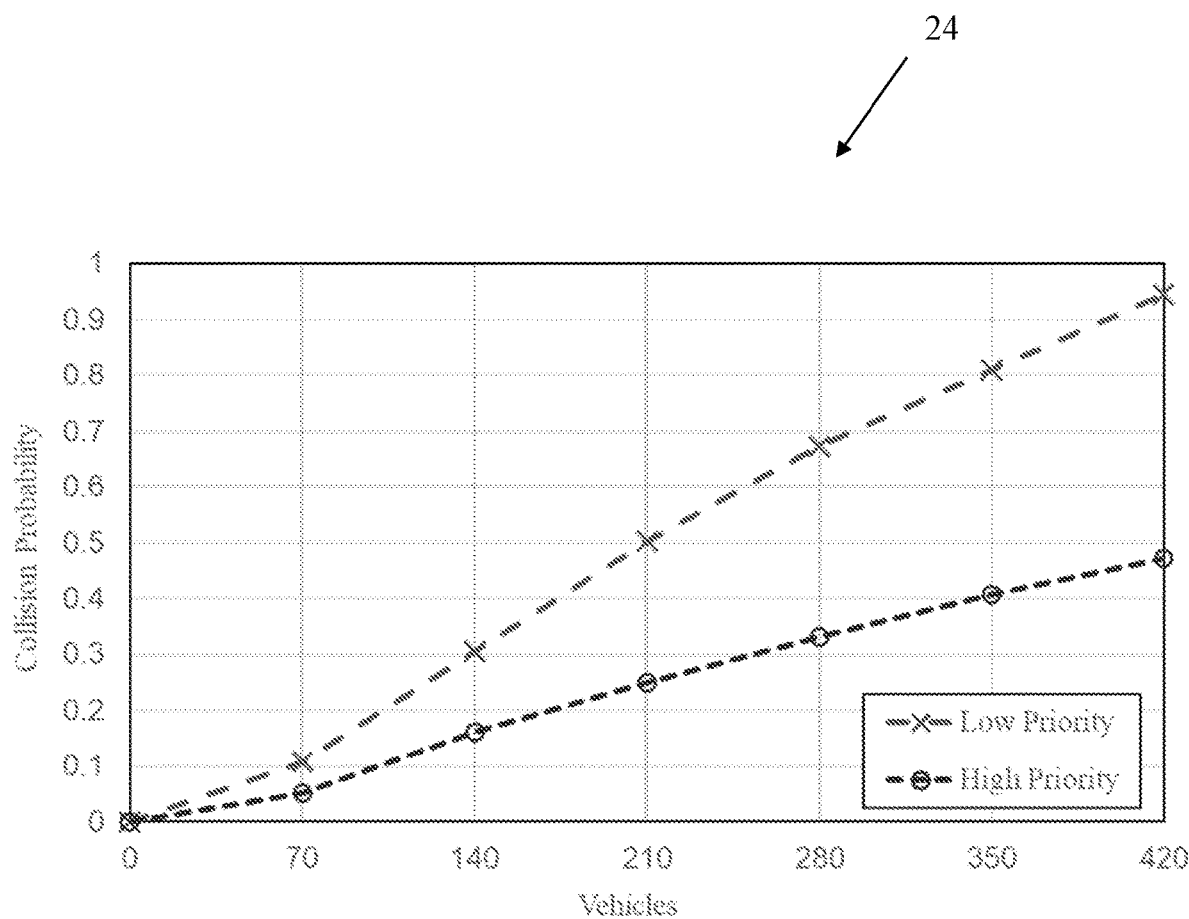
FIG. 4 is a diagram showing collision probabilities of high and low flows, according to the present invention.

In addition, to justify the efficient and correct performance of the dynamic fine tune-up factor for different types of flows, the high type (priority) of flow for Real-Time uRLLC-dangerous ADAS slicing are adopted and set as RRI=20 ms and RRC∈[25, 75], under the evaluation parameters based on the specified parameters in 5G SL SPS. The shortest RRI set as 20 (ms) contributes to the least transmission delay, and a large RRC range contributes to continuous large transmissions of uRLLC-dangerous and uRLLC-warning ADAS slicing. Conversely, for the low type (priority) of flow for non-real-time uRLLC-safe ADAS or mMTC slicing are adopted and set as RRI=100 (ms) and RRC∈[5, 15]. The higher type of flow always yields a higher $\delta^k$ and a significant lower contention collision probability, such as the collision probability 24 shown in FIG. 4. FIG. 4 is a diagram showing collision probability of high and low flows, according to the present invention.

The 5G/B5G SL SPS specifies the sensing window of $[t_{n-1000}^{sf}, t_n^{sf}]$ for the sender to sense and to monitor, and then estimates available resource in the selection window of $[t_{n-1000}^{sf}, t_n^{sf}]$ for randomly contending resource. In a condition that the sender with RRC=0 will execute either the keeping resource reservation (in case of $p \leq P_{rk}$) or re-selecting new resource (in case of $p > P_{rk}$). The sensed resource state $W^{Sensing}$ in sensing window easily leads to the inconsistent resource state in selection window $W^{Selection}$. The randomly contending of resource in 5G/B5G SL SPS suffers from the inconsistent states for contention, and thus easily yields high contention collision probability and leads to inefficient resource reservation. The present invention proposes the resource watching window $W^{Watching}$, for the sender to request a receiver's resource pool state within the period of $t_n^{sf}, t_{n+Max_{v_i\{RRI_i\}}}^{sf}$ through the resource watching window. By using the resource watching window $W^{Watching}$, the sender can clearly monitor the allocated resource usage and avoids reserving these reserved ones, and then minimizes the contention collision probability. Particularly, for initializing a real-time high type of flow of uRLLC-dangerous, i.e., $W^{Watching}$ with RRI=20 (ms), in a condition that two vehicle senders $V^{i,k}$ and $V^{i+1,k}$ contend resource reservation in the selection windows of $[t_n^{sf}, t_{n+20}^{sf}]$ and $[t_{n+20}^{sf}, t_{n+40}^{sf}]$, respectively. As a result, the case with $W^{Watching}$ can efficiently avoid contention collision; however, the case without may led to collision.

In the randomly contention-based SL SPS, 5G/B5G specification neglects the processing after contention collision. For example, when the contention is successful, the sender vehicle receives a HARQ_ACK message as a positive notification for flow data packets transmission; otherwise, when receiving a HARQ NACK message, the sender definitely realizes that the contention is collided and then executes resource contention again. As a result, for instance, these collided senders may contend TB immediately or at another time, and it leads to collision again. The next contention time is determined based on three factors: 1) the number of consecutive contention collisions of type k sender vehicle $V^i$, denoted by $n_i^k$, 2) the virtual slot time, denoted by $t_s$, and 3) a random contention window range $r_i \leftarrow rand(\ )$ of $[CW_{i,min}^{k}, CW_{i,max}^{k}]$. The dynamic truncated binary exponential back-off algorithm is shown as below:

$$r_i^k \leftarrow rand() \text{ of } \begin{cases} [0, 2^{3+n_i^k} - 1], & \text{if } n_i^k \leq 5 \\ [0, 2^{3+5} - 1], & \text{if } 5 < n_i^k \leq 10 \end{cases}$$

The back-off waiting delay $t_i^{Backoff}$ of type k sender vehicle, is determined, as follows:

$$t_i^{Backoff} \leftarrow r_i^k \cdot t_s$$

The virtual slot time is set to 8 (ms) because of the round trip delay between two UEs requiring the collision detection time of 4 (ms). In order to avoid the sender vehicle with a large number of consecutive collisions yielding an extremely long contention delay, the maximum contention window $CW_{i,max}^{k}$ is limited by $2^{3+5}$ when $5 < n_i^k \leq 10$, particularly, for example, a collided sender with $n_i^k=3$, the waiting back-off time becomes:

$$r_i^k \leftarrow rand() \text{ of } [0, 2^{3+3} - 1].$$

As a result, the possible range of the waiting back-off time of this sender is 0, 8, 16, 24, . . . , or 248 (ms). Thus, after waiting for the back-off time, the sender is allowed to contend the resource TB within the resource selection time $W^{selection}$ of RRI again, so that contention collisions are decreased to improve usage rate of the semi-persistent scheduling resource. It should be noted that in the worst case of the dynamic TBE algorithm (e.g. $n_i^k=6$), the back-off waiting delay is increased to $(2^{3+5}-1)*8$ or 2040 (ms).

The collided senders may contend TB immediately or use the TB resource at a distributed time, but the collision easily occurs because the senders are in the same collision domain. In the other hand, with the TBE back-off mechanism, the collision domains are differentiated differentially according to the number of consecutive collisions $n_i^k$, flow type, and the randomly exponential function rand(•), so contention collision probability is certainly decreased obviously.

In summary, applying the extended Sigmoid-based adaptive keeping reservation threshold probability function $P_{rk}^{k}$ (•), the watching window $W^{Watching}$, and the dynamic TBE back-off algorithm is able to efficiently achieve several objectives for improving the randomly contention-based 5G/B5G SL SPS specification. Differentiating collision domains for different types of flows by using the extended Sigmoid-based adaptive function is able to decrease the contention collision probability efficiently. Based on the dynamic collision probability, the proposed adaptive keeping reservation threshold probability function $P_{rk}^k(\cdot)$ is determined adaptively for individual vehicle, while the individual vehicle enters in the randomly conditional piggyback-based resource reservation when RRC=0. By using the sensing window with watching window, the sender vehicle clearly knows the allocated usage resource from the sensing window period as well as accurately knows the resource pool state in the watching window period. As a result, the above-mentioned solution can effectively reduce the contention collision due to blindly random resource reservation. Moreover, differentiating collision domains for vehicles with different number of collisions by using the TBE back-off is able to reduce the contention collision probability efficiently.

The operation of the method of the present invention will be illustrated in detailed in the following paragraphs. Please refer to FIG. 5, which is a flowchart of an adaptive extended keeping reservation threshold probability mechanism method with resource watching window and dynamic back-off for contention-based 5G/B5G sidelink, according to the present invention.

Figure 5:
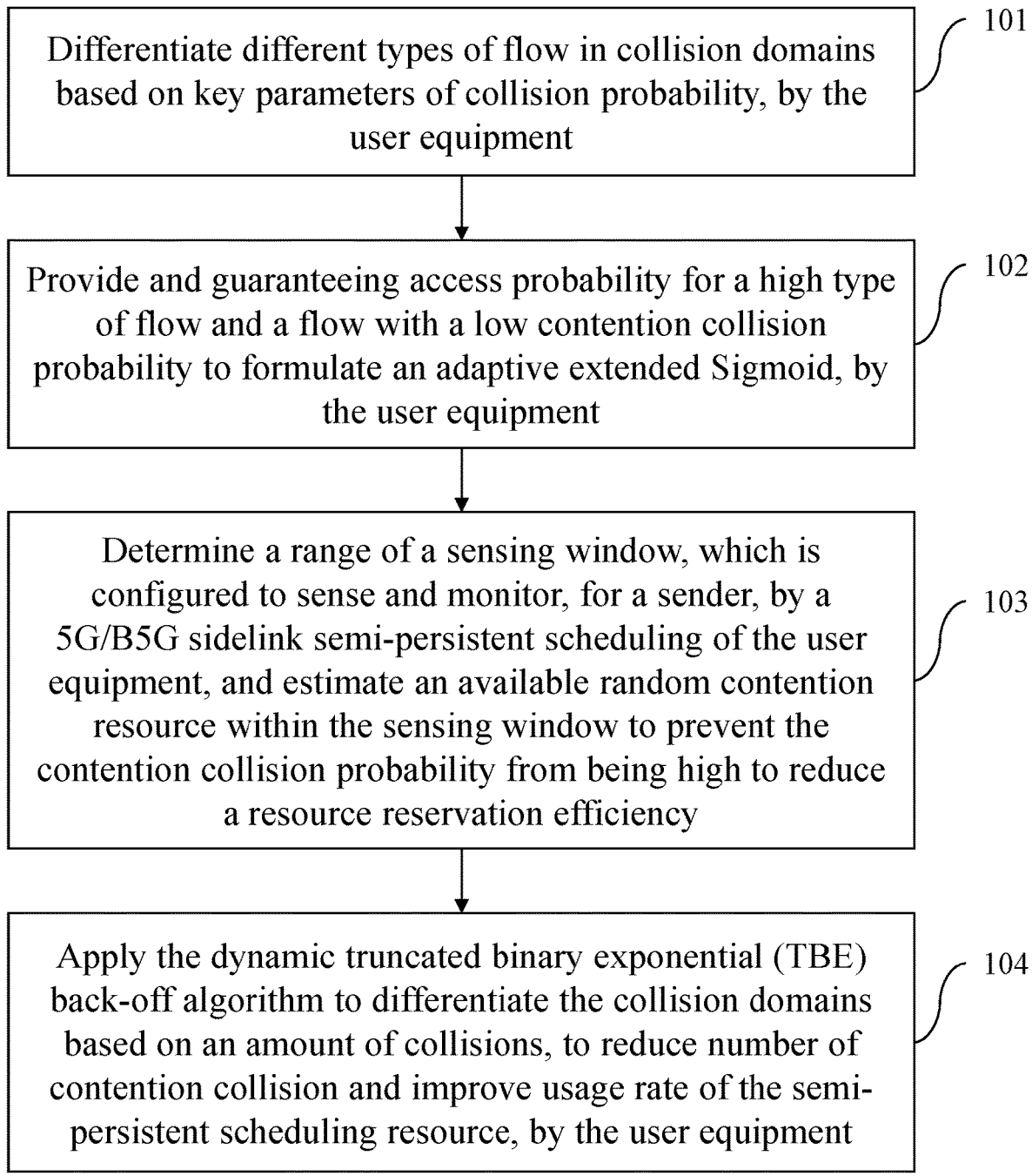
FIG. 5 is a flowchart of an adaptive extended keeping reservation threshold probability mechanism method with resource watching window and dynamic back-off for contention-based 5g sidelink, according to the present invention.

As shown in FIG. 5, the adaptive extended keeping reservation threshold probability mechanism method with resource watching window and dynamic back-off for contention-based 5G/B5G sidelink is adapted to a vehicle communicating via 5G/B5G, and includes the following steps.

In a step 101, the user equipment differentiates different types of flow in collision domains based on key parameters of collision probability. In a step 102, the user equipment provides and guarantees access probability for a high type of flow and a flow with a low contention collision probability to formulate an adaptive extended Sigmoid. In a step 103, a 5G sidelink semi-persistent scheduling of the user equipment determines a range of a sensing window, which is configured to sense and monitor, for a sender, and estimates an available random contention resource within the sensing window to prevent the contention collision probability from being high to reduce a resource reservation efficiency. In a step 104, the user equipment applies the dynamic truncated binary exponential (TBE) back-off algorithm to differentiate the collision domains based on an amount of collisions, to reduce number of contention collision and improve usage rate of the semi-persistent scheduling resource.

According to above-mentioned contents, the difference between the present invention and the conventional technology is that the adaptive extended Sigmoid mechanism of the present invention can be applied to reduce the contention collision probability for the different types of flows contending a usage resource; the watching window can be applied to guarantee certain probability and reserve resource for the high priority flow; applying dynamic truncated binary exponential (TBE) back-off mechanism can stagger the flows occurring resource collision to avoid the same consecutive collision, so as to effectively reduce contention collision probability, and improve resource usage rate and the probability of successful flow transmission.

Therefore, the above-mentioned solution of the present invention is able to solve the problem that there is no effective mechanism for IoV Vehicle-to-Everything (V2X) communication of unicasting or groupcasting in 5G/B5G sidelink semi-persistent scheduling to avoid contention collision, so as to achieve the effect of minimizing collision probability and access delay and maximizing successful probability and throughput.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An adaptive extended keeping reservation threshold probability mechanism system with resource watching window and dynamic back-off for contention-based 5G/B5G sidelink, wherein the adaptive extended keeping reservation threshold probability mechanism system is adapted to a user equipment communicating via 5G/B5G, the user equipment includes a hardware processor is configured to execute following instructions stored in a memory:

differentiating different types of flows in collision domains based on key parameters of collision probability;

providing and guaranteeing access probability for a high type of flow and a flow with low contention collision probability, to formulate an adaptive extended Sigmoid, wherein the adaptive extended Sigmoid is:

$$P_{rk}^k(p_c, p_c^k, U(t)) = 1 - \frac{1}{1 - \delta^k \cdot e^{-p_c}}$$

wherein $P_{rk}^k(\cdot)$ denotes a keeping reservation threshold probability of type k flow; $p_c$ denotes a total contention collision probability; $\delta^k$ denotes a fine tune-up factor based on a collision probability $p_c^k$ of type k flow; and U(t) denotes network utilization and $0<U(t)\leq1$;

a 5G/B5G sidelink semi-persistent scheduling of the user equipment determines a range of a sensing window, which is configured to sense and monitor, for a sender, and estimating an available random contention resource within the sensing window, to prevent the contention collision probability from being high to reduce a resource reservation efficiency; and applying a dynamic truncated binary exponential (TBE) back-off algorithm to differentiate the collision domains based on an amount of collisions, to reduce an amount of contention collisions and improve a usage rate of a semi-persistent scheduling resource, wherein the dynamic truncated binary exponential (TBE) back-off algorithm is:

$$r_i^k \leftarrow rand() \text{ of } \begin{cases} [0, 2^{3+n_i^k} - 1], & \text{if } n_i^k \leq 5 \\ [0, 2^{3+5} - 1], & \text{if } 5 < n_i^k \leq 10 \end{cases}$$

wherein $r_i^k$ denotes a random contention window range of type k a collided sender; and $n_i^k$ denotes the number of consecutive contention collisions of type k flow.

2. The adaptive extended keeping reservation threshold probability mechanism system with resource watching window and dynamic back-off for contention-based 5G/B5G sidelink according to claim 1, wherein the resource estimation module differentiates the different types of flows in the collision domains based on key parameters of collision probability.

3. The adaptive extended keeping reservation threshold probability mechanism system with resource watching window and dynamic back-off for contention-based 5G/B5G sidelink according to claim 1, wherein the resource estimation module comprises a resource watching window to monitor the usage of an allocated resource and reserve a reserved resource, so as to minimize the contention collision probability.

4. An adaptive extended keeping reservation threshold probability mechanism method with resource watching window and dynamic back-off for contention-based 5G/B5G sidelink, wherein the adaptive extended keeping reservation threshold probability mechanism method is adapted to a user equipment communicating via 5G/B5G, and comprises:

differentiating different types of flow in collision domains based on key parameters of collision probability, by the user equipment;

providing and guaranteeing access probability for a high type of flow and a flow with a low contention collision probability to formulate an adaptive extended Sigmoid, by the user equipment, wherein the adaptive extended Sigmoid is:

$$P_{rk}^k(p_c, p_c^k, U(t)) = 1 - \frac{1}{1 - \delta^k \cdot e^{-p_c}}$$

wherein $P_{rk}^k$ denotes a keeping reservation threshold probability of type k flow; $p_c$ denotes a total contention collision probability; $\delta^k$ denotes a fine tune-up factor based on a collision probability $p_c^k$ of type k flow; and $U(t)$ denotes network utilization and $0<U(t)\leq 1$;

determining a range of a sensing window, which is configured to sense and monitor, for a sender, by a 5G/B5G sidelink semi-persistent scheduling (SPS) of the user equipment, and estimating an available random contention resource within the sensing window to prevent the contention collision probability from being high to reduce a resource reservation efficiency; and applying a dynamic truncated binary exponential (TBE) back-off algorithm to differentiate the collision domains based on an amount of collisions, to reduce number of contention collision and improve usage rate of the semi-persistent scheduling resource, by the user equipment, wherein the dynamic truncated binary exponential (TBE) back-off algorithm is:

$$r_i^k \leftarrow rand() \text{ of } \begin{cases} [0, 2^{3+n_i^k} - 1], & \text{if } n_i^k \leq 5 \\ [0, 2^{3+5} - 1], & \text{if } 5 < n_i^k \leq 10 \end{cases}$$

wherein $r_i^k$ denotes a random contention window range of type k a collided sender; and $n_i^k$ denotes the number of consecutive contention collisions of type k flow.

5. The adaptive extended keeping reservation threshold probability mechanism system with resource watching window and dynamic back-off for contention-based 5G/B5G sidelink according to claim 4, wherein the step of determining the range of the sensing window for the sender to sense and monitor and estimating available random contention resource within the sensing window to prevent the contention collision probability from being high to reduce resource reservation efficiency, comprises:

differentiating the different types of flows in the collision domains based on key parameters of collision probability.

6. The adaptive extended keeping reservation threshold probability mechanism system with resource watching window and dynamic back-off for contention-based 5G/B5G sidelink according to claim 4, further comprising:

applying a resource watching window to monitor the usage of an allocated resource and reserve a reserved resource, so as to minimize the contention collision probability.

* * * * *